United States Patent
Nimbalker et al.

(10) Patent No.: US 9,794,921 B2
(45) Date of Patent: Oct. 17, 2017

(54) METHOD AND APPARATUS FOR REDUCING LATENCY OF LTE UPLINK TRANSMISSIONS

(71) Applicant: MOTOROLA MOBILITY LLC, Chicago, IL (US)

(72) Inventors: Ajit Nimbalker, Buffalo Grove, IL (US); Hossein Bagheri, Urbana, IL (US); Vijay Nangia, Algonquin, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/798,492

(22) Filed: Jul. 14, 2015

(65) Prior Publication Data
US 2017/0019883 A1     Jan. 19, 2017

(51) Int. Cl.
*H04Q 7/00*     (2006.01)
*H04W 72/04*    (2009.01)
*H04L 5/00*     (2006.01)

(52) U.S. Cl.
CPC ......... *H04W 72/042* (2013.01); *H04L 5/0053* (2013.01); *H04W 72/0446* (2013.01)

(58) Field of Classification Search
None
See application file for complete search history.

(56) References Cited

U.S. PATENT DOCUMENTS

| 8,379,507 B2 * | 2/2013 | Bertrand | H04W 72/0406 370/203 |
| 2010/0041370 A1 | 2/2010 | Narasimha et al. | |
| 2012/0287877 A1 | 11/2012 | Han et al. | |
| 2014/0112289 A1 * | 4/2014 | Kim | H04W 16/14 370/329 |
| 2014/0313997 A1 * | 10/2014 | Xu | H04W 72/0413 370/329 |
| 2016/0081065 A1 * | 3/2016 | Shi | H04W 72/048 370/329 |

OTHER PUBLICATIONS

A. Bayesteh, E. Yi, H. Nikopour, H. Baligh, "Blind Detection of SCMA for Uplink Grant-Free Multiple-Access", 2014, 978-1-4788-5863-4/14, all pages.
S. Nanda, D. Goodman, U. Timor, "Performance of PRMA: A Packet Voice Protocol for Cellular Systems," IEEE Transactions on Vehicular Technology, vol. 40, No. 3, Aug. 1991, all pages.

* cited by examiner

*Primary Examiner* — Duc C Ho
(74) *Attorney, Agent, or Firm* — Matthew C. Loppnow; Watson Intellectual Property Group

(57) ABSTRACT

A method and apparatus reduce latency of Long Term Evolution (LTE) uplink transmissions. A Downlink Control Information (DCI) message can be received in a first subframe. The DCI message can indicate a resource assignment and a modulation and coding scheme and can indicate a plurality of cyclic shifts from which a User Equipment (UE) may select one cyclic shift for transmission in a second subframe for an uplink carrier. A cyclic shift can be selected from the plurality of indicated cyclic shifts based on a selection criterion. A data packet can be transmitted on a Physical Uplink Shared Channel (PUSCH) in a resource indicated by the resource assignment and modulation and coding scheme using a Demodulation Reference Signal (DMRS) based on the selected cyclic shift in the second subframe on the uplink carrier.

20 Claims, 8 Drawing Sheets

METHOD AND APPARATUS FOR REDUCING LATENCY OF LTE UPLINK TRANSMISSIONS

CROSS-REFERENCE TO RELATED APPLICATIONS

This application is related to an application entitled "Method and Apparatus for Selecting a Resource Assignment," U.S. patent application Ser. No. 14/798,489 and an application entitled "Method and Apparatus for Reducing Latency of LTE Uplink Transmissions," U.S. patent application Ser. No. 14/798,493, both filed on even date herewith and commonly assigned to the assignee of the present application, which are hereby incorporated by reference.

BACKGROUND

1. Field

The present disclosure is directed to a method and apparatus for reducing latency of Long Term Evolution uplink transmissions. More particularly, the present disclosure is directed to resource selection for reducing latency of Long Term Evolution uplink transmissions.

2. Introduction

Presently, wireless communication devices, such as smartphones, cellular phones, tablets, personal computers, and other devices, communicate using wireless signals over networks, such as over a Long Term Evolution (LTE) cellular network. Many of the communications are sensitive to latency, such as communication delays, that slows down the transfer of data. Unfortunately, there is latency in current systems due to negotiations that a communication device must perform with a base station to transmit data. For example, to transmit data, a device must first request a grant from a base station to transmit the data and then wait for the grant before transmitting the data. This results in undesirable latency that delays communication between the communication device and the network.

Thus, there is a need for a method and apparatus for reducing latency of LTE uplink transmissions.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
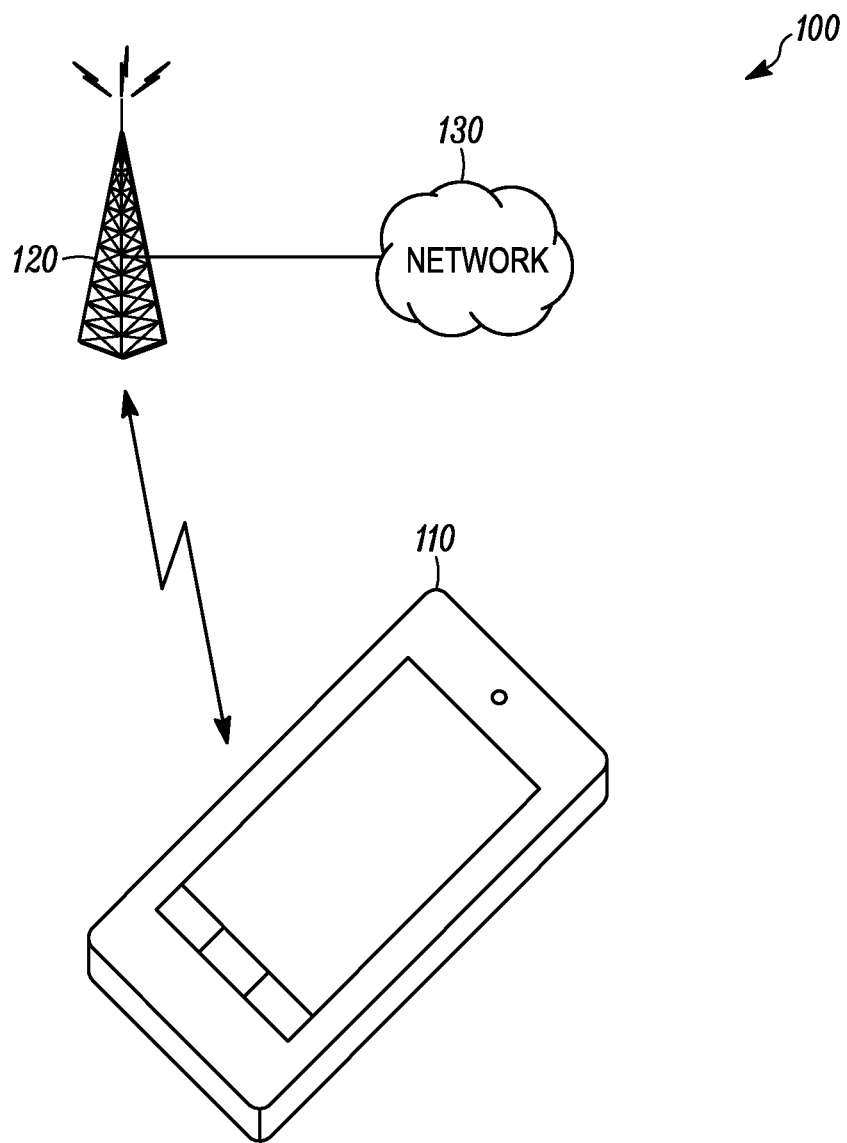
FIG. 1 is an example block diagram of a system according to a possible embodiment.

Embodiments provide a method and apparatus for reducing latency of LTE uplink transmissions.

According to a possible embodiment, configuration information regarding a Downlink Control Information (DCI) message for a Physical Uplink Shared Channel (PUSCH) transmission can be acquired. The DCI message can be received on a Physical Downlink Control Channel (PDCCH) in a first subframe. A PDCCH can be a PDCCH that is demodulated based on cell-specific reference signals or an enhanced PDCCH (EPDCCH) that is demodulated based on dedicated reference signals, or a further enhanced physical downlink control channel or a combination thereof. The DCI message can indicate a plurality of resource assignments in a second subframe for an uplink carrier from which a User Equipment (UE) can select one resource assignment for transmission on the uplink carrier. The DCI message can be Cyclic Redundancy Check (CRC) scrambled by a Radio Network Temporary Identifier (RNTI) that is indicated via higher layers that are higher than a physical layer. A resource assignment can be selected from the plurality of resource assignments using a selection criterion. A data packet can be transmitted on the PUSCH in a resource of the selected resource assignment in the second subframe on the uplink carrier.

According to a possible embodiment, a DCI message can be received in a first subframe. The DCI message can indicate a resource assignment and a modulation and coding scheme and can indicate a plurality of cyclic shifts from which a UE may select one cyclic shift for transmission in a second subframe for an uplink carrier. A cyclic shift can be selected from the plurality of indicated cyclic shifts based on a selection criterion. A data packet can be transmitted on a PUSCH in a resource indicated by the resource assignment and modulation and coding scheme and using a Demodulation Reference Signal (DMRS) based on the selected cyclic shift in the second subframe on the uplink carrier.

According to a possible embodiment, an indication can be acquired, where the indication can indicate a set of frequency domain resource blocks for possible PUSCH transmission in an uplink subframe. A subset of resource blocks can be selected from the set of frequency domain resource blocks for possible PUSCH transmission based on a selection criterion. The selection criterion can use at least a resource set size acquired from the indication, can use a modulo function, and can use an identifier associated with the UE, where a modulo function can be expressed as "mod(a,b)" or as "a mod b," which can denote the remainder after dividing a by b. The PUSCH can be transmitted in the selected subset of resource blocks in the uplink subframe. The time duration (or transmit time interval or subframe duration) for the reduced latency PUSCH may be defined to be similar to Rel-8 TTI size of 1 millisecond, or may be shorter, such as half millisecond, and this can be configurable by the network based on the desired latency reduction target or application. In another example, the frequency domain resource block for possible PUSCH transmission for reduced latency may be defined to be identical to Rel-8 LTE, or it may be defined to correspond to a short transmit time interval, such as 0.5 ms instead of 1 ms. In a further example, the set of resource blocks available for possible PUSCH transmission may be configured only in a subset of subframes of possible uplink subframes. For example, the set of resource blocks may be available in every alternate subframe, RB0-RB6 can be available for possible PUSCH transmission in subframes indexed 0, 2, 4 . . . , etc, and each RB can be 1 millisecond in duration.

FIG. 1 is an example block diagram of a system 100 according to a possible embodiment. The system 100 can include a wireless communication device 110, such as UE, a base station 120, such as an enhanced NodeB (eNB), and a network 130. The wireless communication device 110 can be a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, and/or other communications networks.

The uplink communications from the UE to the eNB utilize Single Carrier FDM(A) (SC-FDMA) or DFT-Spread OFDM(A) (DFT-SOFDM(A)) according to the LTE standard. In SC-FDM or DFT-SOFDM, block transmission of QAM data symbols can be performed by first discrete Fourier transform (DFT)-spreading (or precoding) followed by subcarrier mapping and OFDM modulation with a conventional OFDM modulator. The use of DFT precoding can allow a moderate cubic metric/peak-to-average power ratio (PAPR) which can lead to reduced cost, size and power consumption of the UE power amplifier. In accordance with DFT-SOFDM, each subcarrier used for uplink transmission can include information for all the transmitted modulated signals, with the input data stream being spread over them. Uplink data can be transmitted using PUSCH. While embodiments describe uplink packet transmission based on the LTE standard, it is noted that the same techniques can applied for uplink transmissions based on other modulation schemes such as conventional OFDM and other transmission schemes.

Embodiments can provide for resource allocation and resource selection aspects of reduced latency LTE uplink transmissions. Latency reduction for a user's data packets can provide better user experience, reduced complexity, such as reduced buffering requirements and other reduced complexity, and improved performance, such as faster link adaptation/feedback, improved TCP performance, and other improved performance while also supporting new applications that may be delay critical, such as augmented reality applications, vehicular communication applications, and other applications that may be delay critical.

For a UE in Radio Resource Control_Connected (RRC_CONNECTED) state, the UE can typically look for downlink grants in every downlink subframe, which can be onemillisecond duration. If an eNB receives a packet that is to be transmitted to a UE, it can immediately transmit that packet to the UE in the next downlink subframe using the control and data channels in the subframe, such as PDCCH or an EPDCCH and a Physical Downlink Shared Channel (PDSCH).

Figure 2:
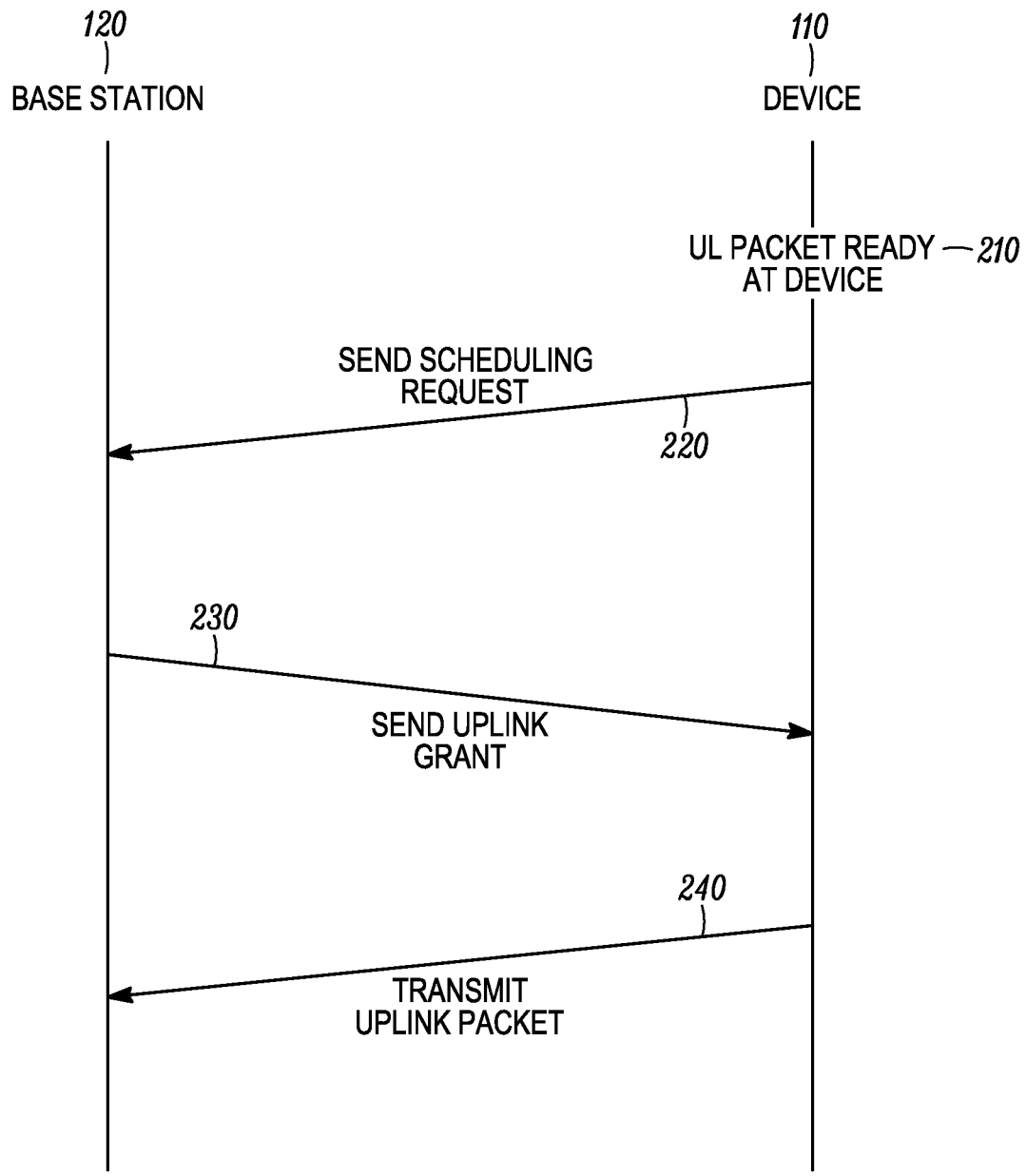
FIG. 2 is an example signal flow diagram illustrating signals between a wireless communication device and a base station required to transmit an uplink packet using a current LTE uplink mechanism.

FIG. 2 is an example signal flow diagram illustrating the signals between the wireless communication device 110, such as a UE, and the base station 120, such as an eNB, required to transmit an uplink packet using a current LTE uplink mechanism. For uplink packet transmission, if an uplink buffer of the device 110 is empty and the device 110 receives an uplink packet in its buffer at 210, typically first the device 110 has to send a Scheduling Request (SR) to the base station 120 at 220, then the base station 120 sends an uplink grant to the device 110 at 230, and then the device 110 transmits the packet on the resources indicated by the base station 120 at 240. Each of the three steps adds to the overall delay that transmission of an uplink packet can experience. Typically, the SR resource is a dedicated resource for a UE, which is configured with a certain periodicity, such as every 5 ms/2 ms/10 ms, etc. Latency for SR transmission can be reduced by providing the UE an SR opportunity on a much more frequent basis, such as by configuring a 2 ms periodicity for all UEs, but this can lead to significantly increased overhead on the uplink.

Figure 3:
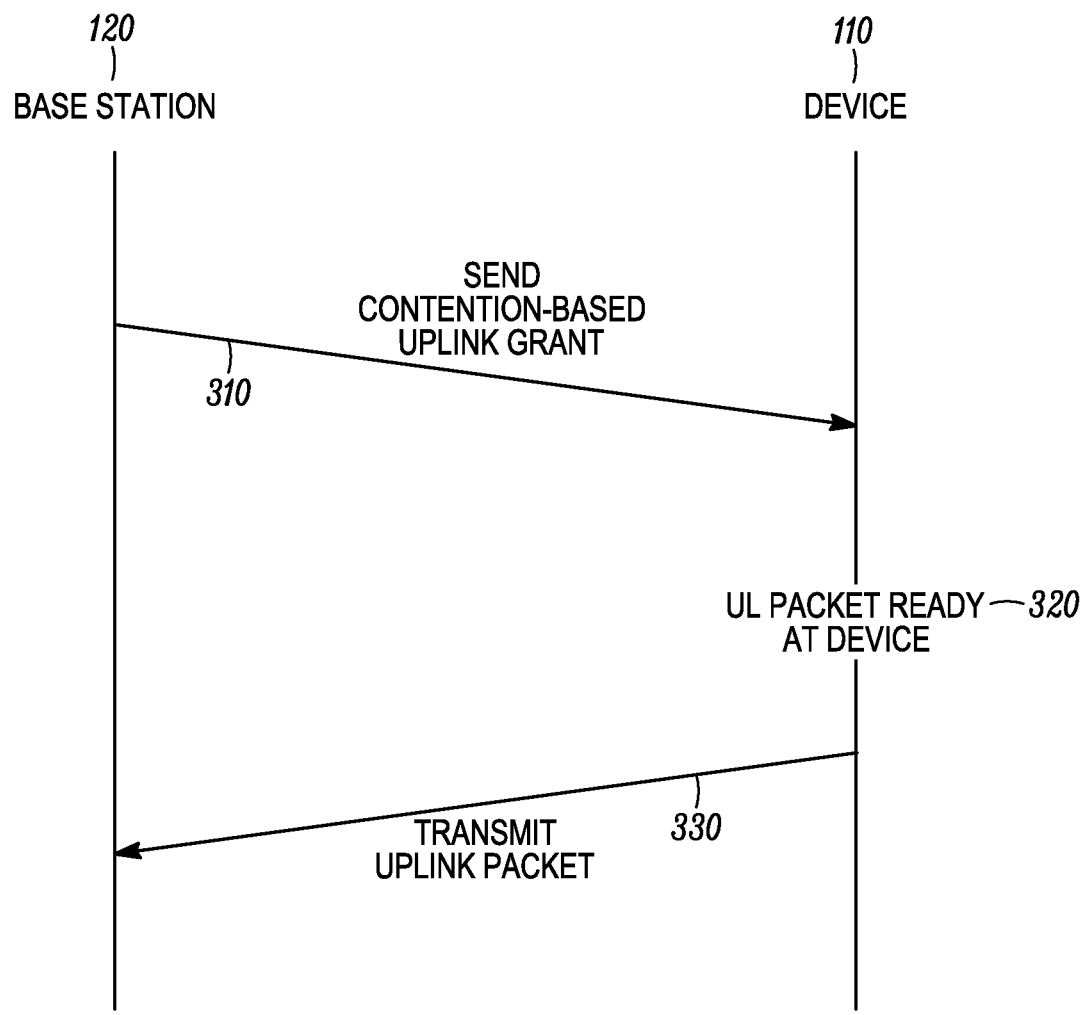
FIG. 3 is an example signal flow diagram illustrating signals associated with an uplink packet transmission between a wireless communication device and a base station using contention-based uplink mechanism according to a possible embodiment.

FIG. 3 is an example signal flow diagram illustrating signals associated with an uplink packet transmission between the wireless communication device 110, such as a UE, and the base station 120, such as an eNB, using a Contention-Based Uplink (CB-UL) mechanism according to a possible embodiment. At 310, the base station 120 can send a contention-based uplink grant, such as via a broadcast or other message, to the device 110. At 320, the device 110 can have an uplink packet ready to transmit. At 330 the device 110 can transmit the uplink packet to the base station 120 using information from the uplink grant. For example, embodiments can avoid the latency due to SR for some uplink transmissions. This can be done by scheduling CB-UL. In this case, an eNB can transmit an uplink grant in its cell, and any UE can utilize that grant to prepare and transmit its uplink packet. The UE can embed certain information in the packet, such as a Medium Access Control Identifier (MAC ID), a Cell Radio Network Temporary Identifier (C-RNTI), and other information so the eNB can determine which UE sent the packet. In another example, a group of UEs configured for CB-UL and possibly addressed, such as by group Contention-Based RNTI CB-RNTI, by the UL grant can use a particular resource assignment in the UL grant.

The contention-based uplink grant can be sent using DCI format 0/1A and/or 1C that support more compact payload sizes relative to some other DCI formats. The grant can be sent in any search space, such as Common Search Space (CSS) or UE-specific Search Space (UESS). In some cases, a CB-UL-Downlink Control Information (CB-UL-DCI) format is aligned with the size of an existing DCI format that the UE searches. Additional blind decodes can also be supported by the UE if the CB-UL-DCI format size is not aligned with an existing DCI format size. For example, four additional blind decodes can be supported in the common search space to support CB-UL-DCI. A special RNTI, such as a CB-RNTI, that is configured via higher layers may be used to distinguish the CB-UL-DCI format from other formats. Alternately, explicit fields may be included in DCI 0/1A and/or 1C to distinguish the CB-UL grant from other grants carried in the DCI format.

For Enhanced Physical Downlink Control Channel (EPD-CCH) UESS, the UESS may be overlapping for a group of UEs. Therefore, the CB-uplink grant can be sent in the UE-specific search space. Then the CB-uplink DCI format payload size may be aligned to the UE's DCI format 0/1A/payload size in the UESS.

According to a possible embodiment, a UE may transmit a packet with low-latency. To transmit the packet, the UE can indicate to the network that it is interested and/or capable of supporting latency reduction on the uplink and the UE can acquire configuration information regarding a DCI message for a Physical Uplink Shared Channel (PUSCH) transmission. The base station may indicate that it can support latency reduction on the uplink via a system information broadcast message or using reserved fields in master information block or dedicated message. A UE may, upon receiving the indication, in turn indicate to the network that it is capable of supporting low-latency also. Then the base station can send configuration information to the UE via system information broadcast message or dedicated message. Alternatively, the network may grant, implicitly or explicitly, a set of UEs camped on the cell to operate in the CB mode under the condition that they have the capability of supporting latency reduction. The network may be aware of such a capability via UE category/capability information. The UE can be in a Radio Resource Control_Connected (RRC_Connected) state, and can be performing Radio Resource Management (RRM) measurements, such as measurements including pathloss estimate and other measurements, and can be maintaining uplink time alignment, such as when a Timing Alignment timer is not expired, based on network commands, such as Timing Advance (TA) commands, and based on the UE's own timing adjustments based on downlink received timing. The UE can then acquire information, such as via Medium Access Control (MAC), RRC, or other sources of information, indicating a set or multiple set of resources for possible contention based (CB) PUSCH transmission. The UE may also acquire other information such as set of open loop power control parameters (P0, alpha, etc.), set of modulation and coding scheme parameters, redundancy version, virtual cell identity used for e.g., reference signal generation, and other information, that is also relevant for transmission of the CB PUSCH transmission. When the UE has data in its UL buffer and the data is to be transmitted with low latency, it can search a downlink control region to detect an uplink grant intended for the UE, such as from a first DCI message via DCI format 0/4 with CRC scrambled with UE's C-RNTI. The contention-based PUSCH transmissions may be configured only on primary cell or on a subset of cells configured for the UE.

If UE does not detect DCI intended for the UE, the UE can detect second DCI message with a second RNTI. For example, the UE can receive the second DCI message on a Physical Downlink Control Channel (PDCCH) in a first subframe. The second DCI message can indicate a plurality of resource assignments in a second subframe for a first carrier from which the UE selects one resource assignment for transmission on the first carrier. The second DCI message can be Cyclic Redundancy Check (CRC) scrambled by a Radio Network Temporary Identifier (RNTI) that is indicated via higher layers that are higher than a physical layer. For example, the second DCI message can indicate a plurality of resource assignments that are a subset of resource assignments indicated by the information acquired via MAC, RRC, and/or another DCI message. The UE can then use a selection method to select a subset of UL resources from the set of resources for possible CB transmission in UL subframe n+k, where k may be fixed, such as to 4 in Frequency Division Duplex (FDD), and k may be variable e.g. based on Time Division Duplex (TDD) Uplink/Downlink (UL/DL) configuration in TDD. The selection method can include the UE choosing one or more of the following: a number of Resource Blocks (RBs), an MCS index, transport block size, Demodulation Reference Signal (DMRS) cyclic shift, and DMRS Orthogonal cover code (OCC) sequence. The UE can then transmit PUSCH using the selected UL resources and associated parameters, such as modulation & coding scheme, power control settings, and other parameters, to transmit the UL data. The UE may also embed its identifier, such as a UE Identifier (UE ID) or C-RNTI, or other UE identifier, that an eNB can utilize to detect which UE sent the associated PUSCH transmission. The UE may also include a buffer status report in the associated PUSCH. If eNB successfully detects the PUSCH, then the eNB can acknowledge the packet reception by sending feedback to the UE using the Physical Hybrid-Automatic Repeat Request (ARQ) Indicator Channel (PHICH) or by sending an explicit downlink message addressed to the UE. The UE can then clear the contents of the UL buffer. The PUSCH that is transmitted based on contention-based resource can also be denoted as low-latency PUSCH.

Embodiments can provide for multiple resource assignments in a single grant. For example, the common-search space, such as on PDCCH, may be overloaded and can provide only a limited number of transmission opportunities where only 4 grants can be transmitted and a Common Search Space (CSS) capacity is 16 CCEs. Therefore, for CB-uplink, a single CB-based grant can schedule uplink on multiple uplink resources in a given subframe. When extra blind decodes are allowed to accommodate the CB uplink transmissions, then an extended common-search space may be defined using the System Information Radio Network Temporary Identifier (SI-RNTI) or CB-RNTI with more candidates for aggregation levels 4 or 8, and/or additional candidates for aggregation levels 1 and 2. New common search space with different aggregation levels (e.g. 2, 4, 8, 16) may be defined for EPDCCH.

A first example of CB-grant fields indicating a plurality of resource assignments can include a 0/1A differentiation field. The CB-grant fields can include fields for first resource assignment including a frequency hopping flag, a RB assignment field, MCS, TPC for PUSCH, and cyclic shift for DMRS and OCC index. The CB-grant fields can include fields for a second resource assignment including a frequency hopping flag, a RB assignment, MCS, TPC for PUSCH, and cyclic shift for DMRS and OCC index. The CB-grant fields can also include a resource Allocation (RA) type. These fields can be part of a DCI message. To maintain consistent DCI message size, fields of current DCI messages that are not useful for a CB-grant can be replaced with the additional CB-grant fields. Table 1 illustrates example fields and description of DCI format 1A. Example fields that can be replaced with CB-grant fields include an NDI field, a TPC for PUSCH field, a cyclic shift for DMRS and OCC index field, a CSI request field, and other fields. Table 1 also illustrates example fields and description of DCI format 1C, where the number of bits in 1C can be 12 bits (5 MHz), 13 (10 MHz), 15 (20 MHz), or any other useful number of bits.

TABLE 1

Fields and description of DCI format 0 and 1C

| | Number of bits | Additional information |
|---|---|---|
| Field in DCI format 1A | | |
| carrier indicator field | 0 or 3 | May be used typically on UESS only |
| 0/1A differentiation field | 1 | |
| Freq hopping flag | 1 | |
| RB assignment | variable | |
| MCS | 5 | |
| NDI | 1 | |
| TPC for PUSCH | 2 | |
| Cyclic shift for DMRS and OCC index | 3 | |
| UL index | 2 | May be used only for TDD |
| DAI | 2 | May be used only for TDD Primary cell |
| CSI request | 1 or 2 | 2-bits can be used for CA and DCI mapped to UESS |
| SRS request | 1 or 2 | May be used only for DCI mapped to UESS |
| RA type | 1 | May be present only when UL Sys BW < DL sys BW |
| Field in DCI 1C | | |
| Gap value | 1 | |
| RB assignment | Variable | depends on the DL system bandwidth and Gap |
| MCS | 5 | |

In a second example, one or more grants may be jointly coded to reduce payload or to fit the grant into existing UL DCI payloads. In this example, the CB-grant fields can include a 0/1A differentiation field. The CB-grant fields can also include fields for first and second resource assignment including a field to interpret joint assignment, a joint frequency hopping flag, a joint RB assignment field, joint MCS, Joint Transmit Power Control (TPC) for PUSCH, and joint Cyclic shift for DMRS and OCC index selection. The CB-grant fields can also include the RA type.

To elaborate on an example, there can be a field to interpret joint assignment, which when set to 0 can indicate there is no second resource assignment. If that field is set to 1, it can imply that there is a second resource assignment in the grant. If the RB assignment field indicates that RB0 and RB1 are part of the first resource assignment, then the second resource assignment can be the next two resource blocks, RB2 and RB3. The joint MCS field can indicate a single MCS is used for both resource assignments. A UE that receives such an uplink grant can select one of the resource assignments based on a random selection or using a set of predetermined rules. For instance, if the number of RBs for each resource assignment is not the same, then the UE can select the resource assignment based on its uplink buffer status. The UE can also select a resource assignment based on a pathloss value threshold. The threshold may be configured via higher layer signaling.

Embodiments can provide for UE autonomous selection from a contention-based resource region. For example, to reduce latency for uplink packets, an eNB may configure, such as via higher layers, a set of resource blocks in the uplink or a frequency region in the uplink system bandwidth. These resources can be used by any UE or a set of UEs to transmit on the uplink, which can include a Buffer Status Report (BSR). The resources can be advertised in a SIB, in a RRC message, and/or in any other useful message, and can be used by the UE any time it wants to transmit a packet with low latency, without having to wait for SR transmission, or in other useful instances. For example, the UE can acquire an indication from the eNB that indicates a set of frequency domain resource blocks for possible PUSCH transmission in an uplink subframe.

The configured resources can be implicitly indicated. For instance, resources used for Device to Device (D2D) or sidelink operation can also be used to indicate resources to be used for advertised uplink resources. For TDD Enhanced Interference Mitigation and Traffic Adaptation (EIMTA), the set of uplink resources used for CB-uplink may be limited to the uplink subframes indicated by the TDD configuration corresponding to the DL-reference UL/DL configuration. In another option, the set of UL resources to be used for CB-uplink may be determined using the UL/DL configuration indicated by the dynamic UL/DL configuration indicated in the DCI format 1C with CRC scrambled by EIMTA-RNTI. In another example, the resources can be indicated by RACH resources/configuration. Since RACH resources are allocated by a cell to serve UEs camped on that cell, the number of UEs attached to that cell can implicitly be taken into account. Therefore, that information can be used to allocate the number of CB-UL resources. For instance, the CB-UL resources can be determined based on a formula which takes into account the RACH configuration.

As another example, a subset of RACH resources can be reused for CB-UL resources. In one simple example, all PRACH resources can be reused as CB-UL resources. For instance, PRACH configuration index 45 can have 6 RB resources available every odd subframe that can be reused for CB UL transmissions. In this particular example, no extra signaling may be needed to inform UEs about CB-UL resources. This approach may require extra detection processes at the eNB side.

The eNB can configure, such as via higher layers, a set of Modulation and Coding Scheme (MCS) and/or transport block sizes that the UE may use to transmit an uplink packet in the configured resources. Alternatively, such configuration may be fixed in specifications, for example, if contention-based uplink is used to transmit BSR or other fixed size payload. MCS and/or TBS can also be dependent on other parameters, for instance, the channel quality of the link between UE and the eNB, such as in a case of TDD operation, where reciprocity may be assumed. The eNB can also configure, such as via higher layers, a set of cyclic shifts and/or cover code sequences that any UE can use to transmit DMRS along with an uplink packet in the configured resources.

The eNB can additionally configure, such as via higher layers, a set of PHICH resources, such as for sending ACK/NACK feedback information associated with uplink transmissions in the configured resources, that a UE can use to receive feedback about its uplink transmission in a configured resource. The eNB can further configure, such as via higher layers, a separate set of power control setting parameters, such as P0, alpha, and other power control settings that a UE use for transmitting on the uplink in the configured resources. The eNB can also control the use of the higher layer configured uplink resources dynamically via physical and/or MAC layer signaling.

According to a first implementation, an eNB can configure a set of resource blocks (e.g. RB0, RB1, RB2, RB4) for contention-based uplink and eNB can expect a UE to pick one resource block and transmit on that resource block. The UE can select the resource block based on a hashing function which can be based on UE's C-RNTI, Subframe number, System Frame Number, a set configuration index, UE-eNB link quality, determined Cyclic Shift (CS) and Orthogonal Cover Code (OCC) index, and other useful information. For example, UE can pick one RB of the set of RB indexed by (L*M+C-RNTI+SFN) mod N_RBs, where L is selected from the {0, 1, 2, . . . N_RBs-1}, N_RBs is the number of RB in the set of RBs, M is a constant, and M and N_RBs are relatively prime to each other.

According to a second implementation, an eNB can configure a set of starting resource blocks (e.g. RB0, RB1, RB2, RB4) for contention-based uplink and the UE can transmit on L contiguous resources starting at one of the allowed starting resource blocks from the set. The allowed values of L can be pre-configured or signaled via higher layers, and a UE can select a particular value of L based on the packet or Transport Block (TB) it is attempting to communicate to the eNB. For instance, if the UE wants to communicate a 15 byte transport block, then with 24-bit CRC, the number of information bits can be 15*8+24=144 bits, and for 1 RB (14×14=144 REs), QPSK modulation, can correspond to a coding rate of ½. If the UE has a packet size of 33 bytes, then it can choose to transmit the TB using a 2-RB allocation, for achieving the same coding rate of ½. The UE can use a first orthogonal cover code (OCC) for a 1-RB allocation, and a second orthogonal cover code for a 2-RB allocation. The CS used by the UE for 1-RB and 2-RB allocation can be the same or different.

According to a third implementation, an eNB can configure a set of resource blocks (e.g. RB0, RB1, RB2, RB4) for contention-based uplink, a set of resource allocations (e.g. 1, 2, 4 RB allocations), a set of MCSes (QPSK-rate-½, QPSK, rate-¾, 16QAM-rate-½, etc), a set of Transport Block Sizes (TBSes) (6 bytes of TCP-ACK with additional L2/L3 header, 320 bits of VoIP packet, etc), a set of cyclic shifts (a subset from the allowed set), and/or other configurations. The UE can select from the set of allowed combinations based on its requirement, such as an amount of uplink data to transmit, and can use at least a hashing function that is dependent on at least one of the UE's C-RNTI, Subframe number, System Frame Number, a set configuration index, and/or other information.

According to a fourth implementation, an eNB can configure multiple sets of contention-based uplink resources, each set having one of starting resource blocks (e.g. RB0, RB1, RB2, RB4), and a set of resource allocations (e.g. 1, 2, 4 RB allocations), a set of MCSes (QPSK-rate-½, QPSK, rate-¾, 16QAM-rate-½, etc), a set of TBSes (6 bytes of TCP-ACK with additional L2/L3 header, 320 bits of VoIP packet, etc), a set of cyclic shifts (a subset from the allowed set), and/or other configurations. The UE can select one set from the multiple sets of based on its requirement, such as the amount of uplink data to transmit, and from that set, can use a resource based on at least a hashing function that is dependent on at least one of the UE's C-RNTI, Subframe number, System Frame Number, a set configuration index, and/or other information. Each set may be associated with a resource allocation. For example, a first set can have allocations of 1 RB only, a second set may have allocation of 2 RB only, etc.

The above implementations illustrate ways of having an eNB configure resources at higher layer and can rely on eNB blind decoding in the set of allowed resources to detect uplink transmissions from UEs that are using these resources. The number of blind decodes can be limited. For instance, the transmission length in RBs can be indicated to the eNB by means of implicit/explicit indication. One example of explicit indication could be the first "m" bits of each, or a subset of, RB(s) can be allocated to represent RB index. The RB index can illustrate how many RBs are utilized for this transmission. In another example, a subset of RBs can be used for a single RB transmission, while another subset could be used for 2 RB transmissions and so on. For instance, all CB-RBs can be used for single RB transmission, while 2 RB transmissions may only be allowed in certain resources, and so on.

According to a fifth implementation, an eNB can configure multiple sets of contention-based uplink resources, each set having one of starting resource blocks (e.g. RB0, RB1, RB2, RB4), and a set of resource allocations (e.g. 1, 2, 4 RB allocations), a set of MCSes (QPSK-rate-½, QPSK, rate-¾, 16QAM-rate-½, etc), a set of TBSes (6 bytes of TCP-ACK with additional L2/L3 header, 320 bits of VoIP packet, etc), a set of cyclic shifts (a subset from the allowed set), and/or configurations. The UE can select one set from the multiple sets based on its requirement, such as an amount of uplink data to transmit, and/or at least based on a physical layer signaling. Thus, an eNB can control the contention based resources based on physical layer signaling. The physical layer signaling can be based on one or more fields within a common DCI transmitted over a control channel. For instance, the DCI can have a one-bit indicator associated with a set indicating whether a UE can use the set or not use the set in a corresponding subframe. For instance, if the UE receives the DCI in downlink subframe n, the corresponding fields may apply to uplink sets in subframe n+4 or in a pre-determined uplink subframe, such as n+k, where k can be signaled by eNB or based on a UE capability indicated to the network or based on a set of configurations such as TDD configuration. An example is shown in Table 2. In another example, for instance, the DCI can have a one-bit indicator associated with each set indicating whether a UE can use the set or not use the set in a corresponding subframe.

TABLE 2

Uplink Type C Resource Indicator Field

| Value of the Uplink Type C Resource Indicator Field | Description |
| --- | --- |
| '00' | First set of uplink resources configured by higher layers |
| '01' | Second set of uplink resources configured by higher layers |
| '10' | Third set of uplink resources configured by higher layers |
| '11' | Fourth set of uplink resources configured by higher layers |

Based on the above, only 2-bits may be adequate in the DCI format, but similar fields can be used for also controlling the MCS indicator, TBS indicator, and other information as shown in Table 3.

TABLE 3

Uplink Type C Resource/MCS Indicator Field

| Value of the Uplink Type C Resource/MCS Field | Description |
| --- | --- |
| '00' | First set of uplink resources configured by higher layers, and a first set of MCS |
| '01' | Second set of uplink resources configured by higher layers and a second set of MCS |
| '10' | Third set of uplink resources configured by higher layers and a third set of MCS |

TABLE 3-continued

Uplink Type C Resource/MCS Indicator Field

| Value of the Uplink Type C Resource/MCS Field | Description |
|---|---|
| '11' | Fourth set of uplink resources configured by higher layers and fourth set of MCS |

According to a sixth implementation, resources can be a fraction of a RB in time domain. For instance, the UL portion of the TDD special subframe(s) can be configured as a CB resource.

An eNB can configure a set of resource blocks for contention-based grant region. The can UE perform a hashing function to determine a starting RB and a number of RBs from the set. One of four RRC signaled sets may be as follows:
1. {RB3-6 (Slot 1), RB94-97(Slot 2)}
2. {RB13-16(Slot 1), RB84-87(Slot 2)}
3. {RB23-26(Slot 1), RB74-77(Slot 2)}
4. {RB33-36(Slot 1), RB64-67(Slot 2)}

The set may be defined such that UE does frequency hopping across slots for frequency diversity. A grant can signal the sets allowed, and the UE can select a resource from the allowed sets based on a hashing function. Persistent resources can be allocated, such as one set per subframe, and the set in a given subframe can be a function of the subframe index. Additionally, the eNB may signal multiple sets in a subframe using dynamic signaling. A subset of TB sizes and/or resource allocation size allowed for contention-based grants may be configured by the eNB. A subset of MCS allowed for contention-based grants may be configured by the eNB. If the UE already sent multiple packets in multiple subframes, such as in consecutive subframes, then it can allow other UEs to use the resource. For example, it can perform some backoff or transmit with a smaller probability than its previous attempt. The eNB can configure the probability with which a UE transmits in multiple subframes. The UE may send a contention-based uplink transmission in a subframe only if it has no uplink grant, such as a UE-specific grant, for transmission in the subframe.

An eNB can configure a set of resource blocks for contention-based grant region using a bitmap indication, such as via higher layers, where the bitmap indication can indicate whether a particular resource block belongs to the contention-based grant region. For instance, if the uplink system bandwidth corresponds to 100 resource blocks (indexed RB0, RB1, . . . RB99), then the contention-based grant region can be indicated using a 100-bit bitmap (b0, b1, . . . b99), and if bit b0 is set to 1, then the corresponding resource block RB0 can belong to the contention-based grant region, otherwise RB0 may not belong to the contention-based grant region.

In another example, the higher layer can indicate parameters that can be used to derive a corresponding bitmap, such as indicating a resource block offset, and a number of resource blocks. For example, the eNB may indicate a first offset (O1), and a number of resource blocks (N1), and a second offset (O2), such that a resource block RBx belongs to the contention-based region, if O1<=x<O1+N1 or if O2−N1<x<=O2. If the uplink system bandwidth corresponds to 100 resource blocks (indexed RB0, RB1, . . . RB99), then if higher layers indicate O1=10, O2=25, and N1=5, then a RBx (0<=x, 99) belongs to the contention-based grant region if 10<=x<15 or if 20<x<=25, i.e. the RBs belonging to the contention-based region can be given by {RB10, RB11, RB12, RB13, RB14, RB20, RB21, RB22, RB23, RB24}.

Figure 4:
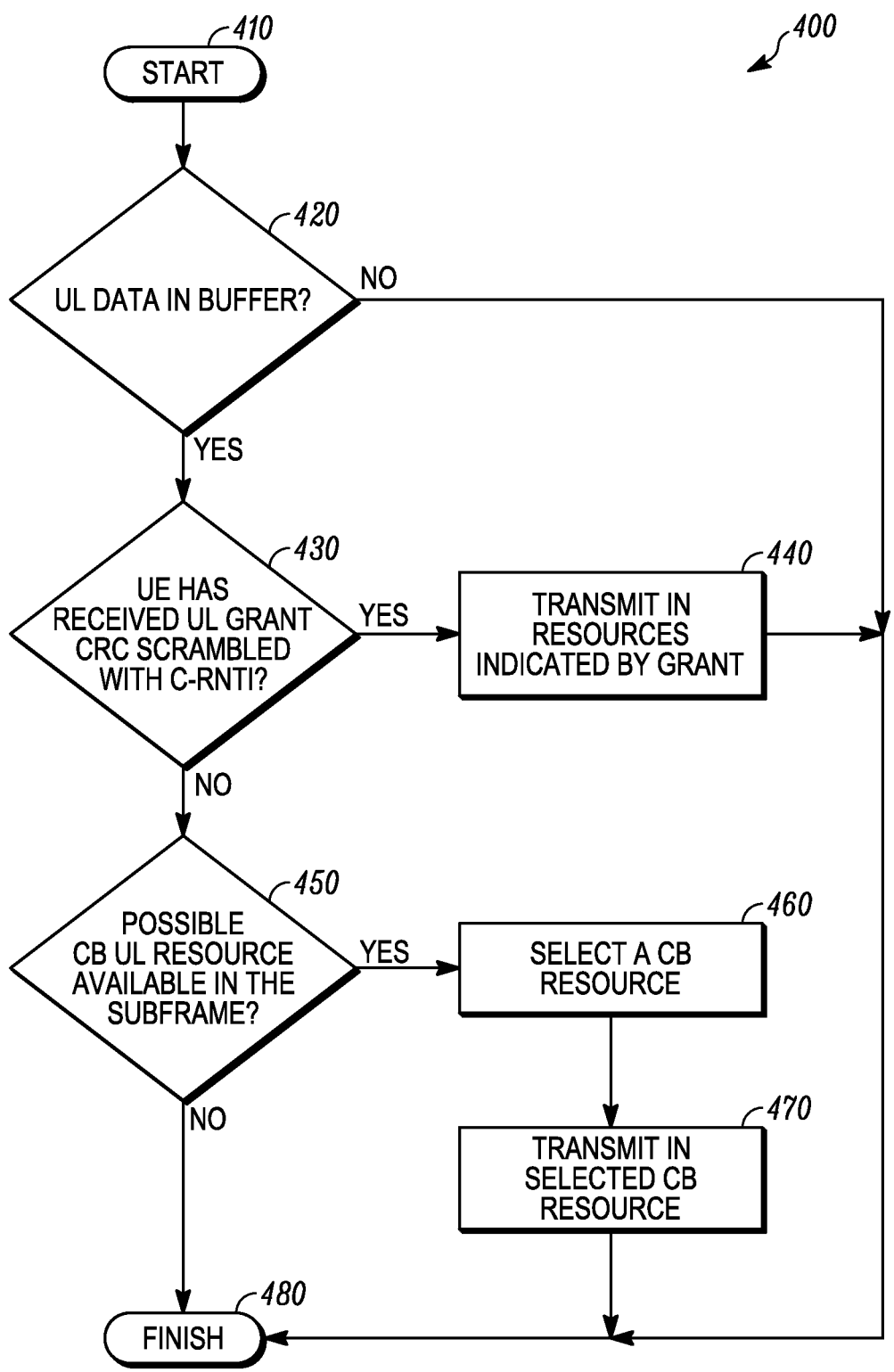
FIG. 4 is an example flowchart illustrating operation of a user equipment for a basic contention-based resource selection scheme according to a possible embodiment.

FIG. 4 is an example flowchart 400 illustrating the operation of a UE for a basic CB resource selection scheme according to a possible embodiment. At 410, the flowchart can begin. At 420, the UE can determine whether it has UL data in its buffer. If the UE has UL data in its buffer, at 430, the UE can determine whether it has received an UL grant CRC scrambled with C-RNTI. If so, at 440 the UE can transmit in resources indicated by the UL grant. If not, at 450 the UE can determine if there are possible CB UL resources available in a subframe. If so, at 460 the UE can select a CB resource and at 470 the UE can transmit in the selected resource. At 480, the flowchart can end.

Embodiments can provide for resource selection, such as selection of a subset of resource blocks, using a hashing function. For example, an uplink resource set, such as a set of frequency domain resource blocks, can include of a set of uplink resources, such as resource blocks, numbered from 0 to $N_{CCE,k}-1$, where $N_{CCE,k}-1$ can be the total number of resources configured in that set in the subframe k. The set of UL resource candidates that a UE may transmit on can be in terms of resource spaces, where a resource space $S_k^{(L)}$ at resource aggregation level L, such as L∈{1, 2, 4, 8}, can be defined by a set of UL resource candidates. The UL resources corresponding to UL resource candidate m of the resource space $S_k^{(L)}$ can be given by:

$$L\{(Y_k+m') \bmod \lfloor N_{CCE,k}/L \rfloor\}+i$$

where $Y_k$ can be defined as described below and i=0, . . . , L−1. For the common resource space, m'=m. For the UE specific resource space, m'=m, where m=0, . . . , $M^{(L)}$−1. $M^{(L)}$ can be the number of UL resource candidates that a UE can be allowed to transmit on in the given resource space. In a first example, the UE may be allowed to select from a set of resource candidates, such as shown in Example 1 in Table 4, where each resource candidate can correspond to a subset of resource blocks. In a second example, the UE can obtain the resource candidate to transmit on directly, such as shown in Example 2 in Table 4. The RA levels defining the resource space also are listed in Table 4.

TABLE 4

Number of candidates for resource selection

| Resource space $S_k^{(L)}$ | | Example 1: Number of candidates $M^{(L)}$ | Example 2: Number of candidates $M^{(L)}$ |
|---|---|---|---|
| Type | RA level L | Size [in RBs] | |
| UE-specific | 1 RB | 6 | 1 |
| | 2 RB | 6 | 1 |
| | 4 RB | 2 | 1 |
| | 8 RB | 2 | 1 |
| Common | 4 RB | 2 | 1 |
| | 8 RB | 2 | 1 |

For the common resource space, $Y_k$ may be set to 0. In some cases, the common resource space may not be necessary or the common resource space may be used for another purpose, such as when the UE has a fixed payload to send.

For the UE-specific resource space $S_k^{(L)}$ at RA level L, the variable $Y_k$ can be defined by $$Y_k=(A \cdot Y_{k-1}) \bmod D$$

where example values can be $Y_{-1}=n_{RNTI} \neq 0$, A and D are relatively large prime number, such as A=39827, D=65537, $k = \lfloor n_s/2 \rfloor$, and $n_s$ can be the slot number within a radio frame. The slot number may be the slot number of the UL subframe in which the UE transmits the uplink. For multi-RB allocations, the RB allocations can be contiguous or non-contiguous based on the configuration of the uplink resource set. The RNTI can be indicated via higher layers, and may be either same or different from the UE's C-RNTI.

A second uplink resource set can also be configured with its own set of uplink resources. The set of uplink resource candidates and the RA levels can be separately defined or configured for each uplink resource set. The variable $Y_k$ can also be defined separately for each uplink resource set, such as for A=39829. Other hashing functions, such as based on EPDCCH hashing, can also be used to determine the UL resource candidate. It is noted that a UE can be configured with multiple uplink resource sets, and it may apply the hashing function described herein separately in each uplink resource set. In a given subframe, the UE can select a uplink resource set based on random selection or based on the number of resource blocks that the UE determines to transmit on.

TABLE 5

Number of candidates for resource selection.

| Resource space $S_k^{(L)}$ | | Example 1 - Number of candidates $M^{(L)}$ | Example 2 - Number of candidates $M^{(L)}$ |
|---|---|---|---|
| Type | RA level L | Size [in RBs] | |
| UE-specific | 1 RB | 2 | 1 |
| | 2 RB | 2 | 1 |
| | 4 RB | — | — |
| | 8 RB | — | — |
| Common | 4 RB | 1 | 1 |
| | 8 RB | — | — |

Embodiments can provide for Scheduling Request (SR) operation under CB-UL transmission. For example, if a UE has already transmitted in a CB-UL resource, but not received an acknowledgment, the UE can transmit a scheduling request for a SR resource. If the UE has received an acknowledgement for the UL transmission in the CB resource, depending on factors such as data type, the UE may release the SR resource, and stop (re-)transmitting a scheduling request. In one example, the UE can be configured with SR and also can use CB-UL resources. The UE can be configured to select between using SR and CB-UL based on its uplink buffer status. For example, if the uplink buffer is smaller than a threshold, the UE can use CB-UL. Otherwise the UE can use SR to initiate transmission of its uplink data. In another example, the UE may always select SR to transmit delay-tolerant uplink data to the eNB. In another example, the UE can select a first available opportunity, CB-UL or SR transmission opportunity whichever occurs earlier, to initiate transmission of the uplink packet.

Embodiments can provide for multiple cyclic shifts and/or orthogonal cover code sequences in a single grant. For example, an eNB can use Space Division Multiple Access (SDMA) or Multiple User Multiple Input and Multiple Output (MU-MIMO) to improve uplink efficiency. It can do so by scheduling UEs on the same time-frequency resources, but spatially separated by configuring the users to transmit DMRS with different cyclic shifts. The CB-UL can use the same technique to improve reception of CB-UL transmissions as well. In this technique, the UE can be configured to select the cyclic shift from an allowed set of cyclic shifts.

For example, a UE can select from eight cyclic shifts for a given DCI format 0 uplink transmission. The exact value of the cyclic shift used by the UE can be indicated via the 3-bit field "Cyclic shift for DMRS and OCC index" in the DCI format 0. An eNB can indicate multiple cyclic shift values via the downlink grant.

For a first example, an eNB can send a single downlink message containing one MCS (MCS0) and resource block assignment (RB0) and more than one cyclic shift value (CS0, CS1, CS2). Upon receiving the message, a UE can select one of the cyclic shift values based on a selection criterion (one of CS0, CS1, CS2) and can transmit on the resource block assignment (RB0) using the indicated MCS value (MCS0). A second UE can select one of the cyclic shift values based on a selection criterion (one of CS0, CS1, CS2) and can transmit on the resource block assignment (RB0) using the indicated MCS value (MCS0). Thus, the UEs can select different cyclic shift values and transmit on the same resource blocks.

For a second example, an eNB can send a first downlink message, such as DCI, containing one MCS (MCS0) and resource block assignment (RB0). The eNB can send a second message, such as via RRC, indicating a set of cyclic shift values (CS0, CS1, CS2). Upon receiving the first message, a UE can select one of the cyclic shift values based on a selection criterion, such as one of CS0, CS1, CS2, where these values can be obtained from the second message, and can transmit on the resource block assignment (RB0) using the indicated MCS value (MCS0). A second UE can select one of the cyclic shift values based on a selection criterion, such as one of CS0, CS1, CS2, where these values can be obtained from the second message, and can transmit on the resource block assignment (RB0) using the indicated MCS value (MCS0). Thus, the UEs can select different cyclic shift values and transmit on the same resource blocks.

In another example, an eNB can configure multiple sets of cyclic shifts and/or orthogonal cover code sequences via higher layers and indicate the particular set of cyclic shifts and/or orthogonal cover code sequences that can be used in a given subframe via the DCI message. An example of the indication is given in Table 6. For example, if a UE receives a DCI indicating cyclic shift indication field of '10', then the UE can select one value from {CS0, CS1, CS2} based on a selection criterion to transmit its DMRS. At least one set can contain a plurality of cyclic shifts.

TABLE 6

Cyclic Shift Indication Field

| Value of the Cyclic Shift Indication Field | Description |
|---|---|
| '00' | First set of cyclic shifts configured by higher layers (e.g. {CS0}) |
| '01' | Second set of cyclic shifts configured by higher layers (e.g. {CS1, CS2}) |
| '10' | Third set of cyclic shifts configured by higher layers (e.g. {CS0, CS1, CS2}) |
| '11' | Fourth set of cyclic shifts configured by higher layers (e.g. {CS0, CS1, CS2, CS3, CS4, CS5, CS6}) |

Embodiments can provide for selection of the uplink resource from multiple grants based on a UE's coverage and eNB signaling. For example, an eNB can send multiple contention-based uplink grants targeted towards UEs of different coverage levels in a cell. For instance, an eNB can send a compact CB-UL grant, such as based on DCI 1C, using a smaller payload size to assist UEs in bad coverage and the eNB can send a non-compact CB-UL grant, such as based on DCI 0/1A, using a slightly larger payload size for other UEs that are in improved coverage. In this case, the grants can be used appropriately by a UE based on its coverage level. For example, the UE can use its downlink pathloss measurements and optionally a relative threshold indicated by the eNB to appropriately select the correct uplink grant to transmit on. Thus, if a UE detects multiple CB-UL grants with different payload sizes, it can select the UL grant to use based on a set of pre-determined rules, including, for example coverage level, downlink measurements, and other parameters. If a UE detects multiple CB-UL grants with the same payload size, it can select one of the grants randomly, or each grant may have an associated probability metric, such as embedded in the DCI, that the UE can use to determine which grant to use. An example grant is shown below. An example grant can include a 0/1A differentiation field, a frequency hopping flag, a RB assignment field, a MCS field, a TPC for PUSCH field, a cyclic shift for DMRS and OCC index selection field, a probability field, and an RA type field. The probability field, such as a 2-bit field, can indicate one of four values, such as 0.25, 0.5, 0.75, and 1, that indicate the probability with which a UE can transmit on the uplink resource indicated by the grant.

As another example, the set of CB-UL resources, such as signaled via higher layer signaling, for UEs with different coverage can be different. For instance, the UEs can be closer to the cell center, such as based on having an RSRP, measured in certain subframes, such as indicated by higher layers, or almost blank subframes, or in subframes containing Discovery Reference Signals, etc., above a signaled/specified threshold. The closer UEs can get a larger CB-UL resource set, whereas UEs that are farther away from the cell center may get a smaller, including the case of an empty set of CB-UL resources, set for contention.

Embodiments can provide for UE detection at the eNB from the received uplink. For example, if a UEID or C-RNTI is embedded in the MAC message, then the eNB can detect it once the uplink TB is successfully decoded. Alternately, the UE may be able to transmit its C-RNTI as uplink control information along with the data on the PUSCH. In this case, the eNB can indicate separate parameters, such as delta parameters to determine the number of REs for transmitting Uplink Control Information (UCI), for the case when UCI is associated with a CB-UL. The C-RNTI may be encoded with an 8-bit or a 16-bit CRC as well as some additional information, such as BSR and/or information from the associated contention-based uplink grant.

Scrambling can be based on the cyclic shift and/or OCC index and/or other parameters that a UE selects from the control message or using the CB-RNTI. For instance, the scrambling sequence for uplink PUSCH transmission can be generated using:

$$c_{init}=n_{RNTI}\cdot 2^{14}+q\cdot 2^{13}+\lfloor n_s/2 \rfloor \cdot 2^9 + N_{ID}^{cell}+f(cs)$$

where $c_{init}$ can be the initialization seed used for scrambling sequence generator for PUSCH transmission, $n_{RNTI}$ can denote the RNTI, $n_s$ can denote the slot number, $N_{ID}^{cell}$ can be the cell Identifier, which may also be a virtual cell ID, q is a MIMO codeword index (e.g. q=1 for single codeword transmission), and f(cs) can denote a function of the cyclic_shift (cs) and/or orthogonal cover code sequence associated with the uplink transmission. As a first example, the function $f(cs)=cs$. As a second example, the function $f(cs)=2^x \cdot cs$, where x can be an integer >0, signaled or fixed in the specification.

Embodiments can provide for PHICH/HARQ retransmissions for Contention-based uplink. For example, if an eNB detects a cyclic shift based on DMRS but fails to detect the uplink data, such as when CRC fails, then the eNB can signal the detected cyclic shift on the downlink to request a retransmission from that UE. For example, the eNB can transmit a dedicated resource addressed to the UE that used the particular cyclic shift on the particular UL resource, such as when the eNB knows, based on a hashing function, that a particular UE may have transmitted using the particular resource with the particular cyclic shift. However, if the eNB fails to detect any transmission on a contention-based resource on the uplink, then it can assume that the corresponding resource was not used. If the eNB detects that there was a transmission on the contention-based resource, but if it fails to detect uplink data, such as when CRC fails, or even a DMRS cyclic shift or the UE that used the particular cyclic shift reliably, then the eNB can use PHICH resource corresponding to uplink contention-based resource to indicate, such as via NACK, that the uplink transmission failed, so the UE can then resort to other means to handle packet failure. For example, the UE may re-attempt to transmit the packet on another contention-based resource or the UE may receive a dedicated resource from the eNB after a longer delay that it can use to transmit the packet.

LTE uplink HARQ is synchronous and can supports both adaptive and non-adaptive (re)transmission(s). For FDD, there can be eight HARQ processes defined in the uplink for single-codeword transmission mode and 16 HARQ processes for two-codeword transmission mode. In either transmission mode, for contention-based uplink, a UE can likely use single codeword transmission. For contention-based transmissions, separate HARQ process(es) can be designated in addition to a regular HARQ processes. In another alternative, a same HARQ process can be shared between contention-based to non-contention based transmission. A NACK on PHICH resource corresponding to an uplink contention-based resource can indicate to the UE that the corresponding uplink transmission has failed and that the UE may have to retry transmitting the packet again. One or more consecutive NACKs on PHICH to the UE can trigger an SR from the UE.

Embodiments can provide for power control. For example, power adjustment in response to UE transmission on a particular resource on which CB uplink takes place can be signaled by the eNB. TPC-CB-RNTI can signal adjustments for multiple resource allocations, such as starting RB location, in the CB resource pool. For example, for a UE transmission in subframe n on a CB-UL resource, the power adjustment can be sent in subframe n+4, which can be used for a subsequent CB-UL transmission by the UE. The adjustment steps may be different than the steps used for non-contention-based UL resources.

According to a possible example for power control, a UE can receive higher layer signaling, such as via MAC or RRC indicating a set of resources for possible contention based (CB) PUSCH transmission. The UE can also receive higher layer signalling indicating open loop power control parameters that the UE can to use for CB transmission. The parameters can include P0 and alpha, such as separate values of P0 and alpha for CB transmission. If the UE has data in its buffer, in each DL subframe n in which PDCCH/EPD- CCH is monitored, the UE can check for DCI format 0/4 intended for the UE, such as with DCI CRC scrambled with UE's C-RNTI.

If UE does not detect DCI intended for the UE, the UE can use a selection method to select a subset of UL resources from the set of resources for possible CB transmission in UL subframe n+k. The selection method can include UE the choosing one or more of the following: a TB size, a number of RBs, a MCS index, DMRS cyclic shift, and DMRS orthogonal cover code sequence. To determine the transmit power for CB-PUSCH transmission, the UE can use the higher layer parameters, such as P0 and alpha, configured for CB transmission, and any TPC adjustment received in a TPC command that corresponds to the subset of UL resources that the UE has selected for CB-PUSCH transmission. The TPC command can be received by the UE via a PDCCH message with DCI format 3/3A DCI CRC is scrambled with an identifier associated with CB-PUSCH transmission, such as a CB-TPC-PUSCH-RNTI. The PDCCH message with DCI format 3/3A can be received by the UE in subframe n, such as for CB-PUSCH transmission in subframe n+k, the UE can use the DCI format 3/3A received in subframe n for adjusting its PUSCH transmission power. Alternately, once the UE is configured by higher layers with a set of resources for possible CB PUSCH transmission, it can start monitoring DCI format 3/3A with CRC scrambled by CB-TPC-PUSCH-RNTI. The DCI can contain TPC commands for multiple subsets of resources within the set of resources for possible CB transmission. The UE can maintain a separate TPC state for each subset and update it based on the TPC commands in each received DCI format 3/3A with CRC scrambled by CB-TPC-PUSCH-RNTI. When the UE selects a particular subset for PUSCH transmission, it can use the TPC state for that subset along with open loop parameters to set its PUSCH transmission power for its transmission in that subset of resources.

If UE detects DCI intended for the UE, the UE can use the RA allocation field in the DCI to determine UL resources for PUSCH transmission in UL subframe n+k. The transmit power used by the UE for PUSCH transmission can be based on open loop power control parameters configured by higher layers for regular PUSCH transmission, and TPC adjustments received in the DCI, such as a DCI that also has the RA allocation filed, and any TPC adjustments received in DCI 3/3A with CRC scrambled by TPC-PUSCH-RNTI. The variable k can be a number fixed in the specifications. For example, for LTE FDD frame structure, k=4. For LTE TDD frame structure, k can depend on the specific UL/DL configuration for the UE and can be, for example, 4 or 6.

In the event of a collision between a sidelink resource and a CB-UL resource, the sidelink UE can drop the sidelink operation. For example, the UE can drop transmission or reception of a sidelink signal in a CB-UL resource.

Figure 5:
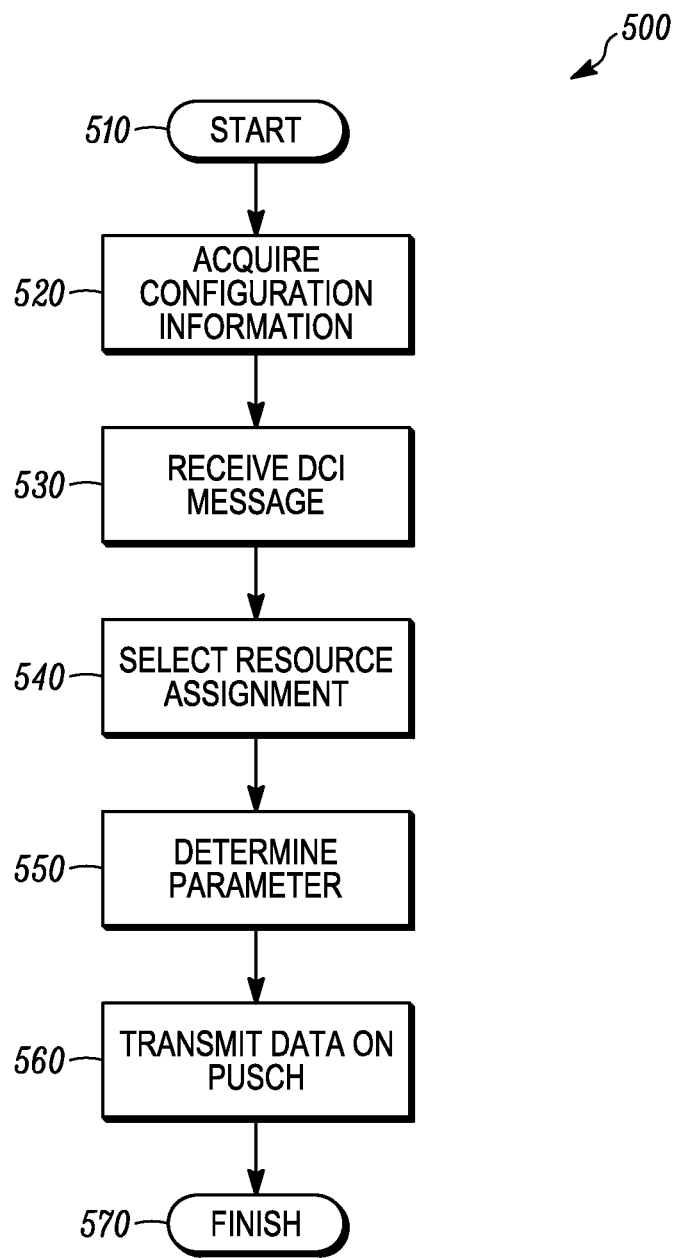
FIG. 5 is an example flowchart illustrating operation of a wireless communication device according to a possible embodiment.

FIG. 5 is an example flowchart 500 illustrating operation of the wireless communication device 110, such as a UE, according to a possible embodiment. The flowchart 500 can be used to signal multiple resource assignments via a single grant. At 510, the flowchart 500 can begin. At 520, configuration information regarding a Downlink Control Information (DCI) message for a Physical Uplink Shared Channel (PUSCH) transmission can be acquired.

At 530, the DCI message can be received on a Physical Downlink Control Channel (PDCCH) in a first subframe. The DCI message can indicate a plurality of resource assignments in a second subframe for an uplink carrier from which the UE can select one resource assignment for transmission on the uplink carrier. The DCI message can be Cyclic Redundancy Check (CRC) scrambled by a Radio Network Temporary Identifier (RNTI) that is indicated via higher layers that are higher than a physical layer. Furthermore, the UE can have a Cell Radio Network Temporary Identifier (C-RNTI) and a contention-based Cell Radio Network Temporary Identifier (CB C-RNTI) configured via higher layers and the DCI can be scrambled by the CB C-RNTI. Each resource assignment of the plurality of resource assignments can have the same number of resource blocks. The number of resource assignments can be explicitly or implicitly indicated in the DCI message. Additionally, the resource assignments can be in an uplink grant. For example, a DCI message can include a plurality of uplink grants, where each can include at least one resource assignment. A resource assignment can contain resource blocks, other info such as transmit power and reference signal configuration, and/or other information useful for transmitting on an UL. Sometimes an uplink grant can have other information beyond the resource assignments.

At 540, a resource assignment can be selected from the plurality of resource assignments using a selection criterion. The selection criterion can be a random selection of the resource assignment from the plurality of resource assignments. The selection criterion can also be based on at least one parameter measured by the UE. For example, the selection criterion can be based on a measured parameter, such as Downlink Reference Signal Received Power (DL RSRP), signal propagation path loss, uplink buffer status, and/or any other useful parameter. Additionally, the UE can have a UE identifier and the selection criterion can be based on at least a hashing function based on the UE identifier.

At 550, a parameter can be determined for transmission of a data packet. According to a possible embodiment, the UE can have a Cell Radio Network Temporary Identifier (C-RNTI) and a cyclic shift and/or Orthogonal Cover Code (OCC) sequence can be determined for a Demodulation Reference Signal (DMRS) for the transmission of the data packet based on the C-RNTI. In some embodiments the Orthogonal Cover Code (OCC) sequence may be fixed or pre-determined. According to another possible embodiment, a cyclic shift and/or Orthogonal Cover Code (OCC) sequence can be determined for a DMRS for the transmission based on at least one field indicated in the DCI message. According to another possible embodiment, a cyclic shift can be determined for a DMRS for the transmission and a scrambling initialization for PUSCH transmission can be selected based on at least the determined cyclic shift for the DMRS for the transmission. According to another possible embodiment, an Orthogonal Cover Code (OCC) sequence can be determined for a DMRS for the transmission and a scrambling initialization for PUSCH transmission can be selected based on at least the determined Orthogonal Cover Code (OCC) sequence for the DMRS for the transmission.

At 560, a data packet can be transmitted on the PUSCH in a resource of the selected resource assignment in the second subframe on the uplink carrier. At 570, the flowchart 500 can end.

Figure 6:
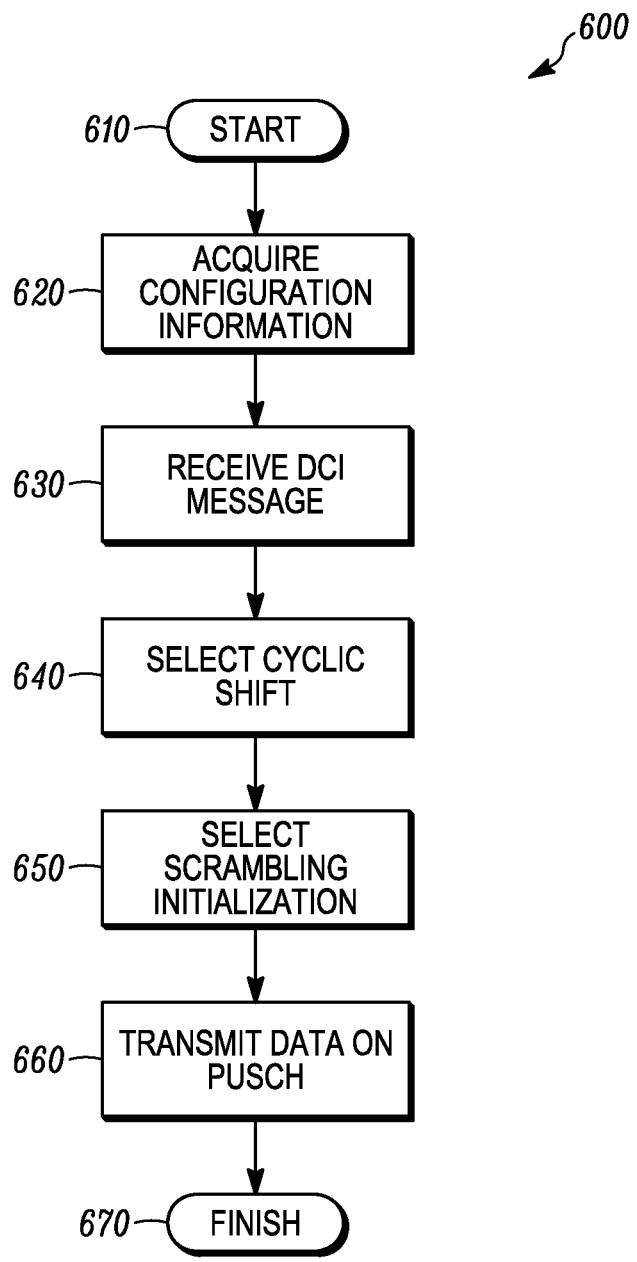
FIG. 6 is an example flowchart illustrating operation of a wireless communication device according to a possible embodiment.

FIG. 6 is an example flowchart 600 illustrating operation of the wireless communication device 110, such as a UE, according to a possible embodiment. The flowchart 600 can be used to signal multiple cyclic shifts via a single grant. At 610, the flowchart 600 can begin. At 620, configuration information regarding a Downlink Control Information (DCI) message for a Physical Uplink Shared Channel (PUSCH) transmission can be acquired.

At 630, the DCI message can be received in a first subframe. The DCI message can indicate a resource assignment and a modulation and coding scheme and indicating a plurality of cyclic shifts from which the UE may select one cyclic shift for transmission in a second subframe for an uplink carrier. The number of cyclic shifts in the plurality of cyclic shifts indicated in the DCI message can be two or any other useful number of cyclic shifts. The DCI message can implicitly indicate the number of cyclic shifts in the plurality of cyclic shifts from which the UE can select one cyclic shift for transmission. The DCI message can be received on a Physical Downlink Control Channel (PDCCH) in a first subframe. The DCI message can indicate the resource assignment and the modulation and coding scheme and can indicate a plurality of cyclic shifts from which the UE may select one cyclic shift for transmission. The DCI message can be Cyclic Redundancy Check (CRC) scrambled by a Radio Network Temporary Identifier (RNTI) that is indicated via higher layers that are higher than a physical layer. Additionally, the indication of a plurality of cyclic shifts can include an indication of a plurality of cyclic shift and Orthogonal Cover Code (OCC) sequence pairs. A first cyclic shift can be indicated using a cyclic shift for Demodulation Reference Signal (DMRS) and OCC index field of the DCI message. A second cyclic shift can indicated using a field used for Transmit Power Control (TPC) for a Physical Uplink Shared Channel (PUSCH) and a field used for New Data Indicator (NDI). This can allow for three bits for indicating a second cyclic shift. The cyclic shifts can also be indicated using any other useful fields or information.

At 640, a cyclic shift can be selected from the plurality of indicated cyclic shifts based on a selection criterion. The cyclic shift and an OCC sequence pair can be selected from the plurality of indicated cyclic shift and OCC sequence pairs based on the selection criterion. At 650, a scrambling initialization can be selected for the PUSCH transmission based on at least the selected cyclic shift for DMRS.

At 660, a data packet can be transmitted on a Physical Uplink Shared Channel (PUSCH) in a resource indicated by the resource assignment and modulation and coding scheme and using a Demodulation Reference Signal (DMRS) based on the selected cyclic shift in the second subframe on the uplink carrier. The data packet can be transmitted on the PUSCH using a DMRS based on the selected cyclic shift and OCC sequence pair. At 670, the flowchart 600 can end.

Figure 7:
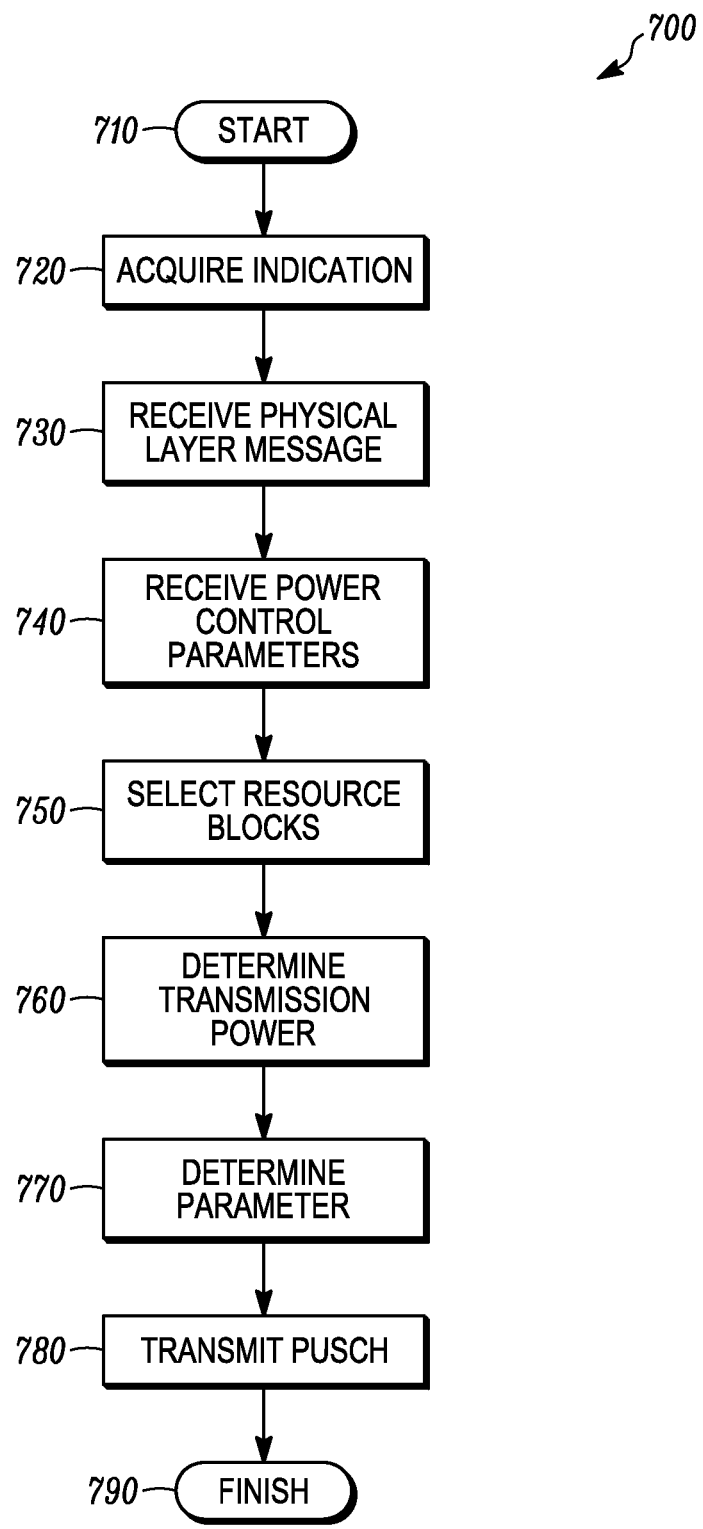
FIG. 7 is an example flowchart illustrating operation of a wireless communication device according to a possible embodiment.

FIG. 7 is an example flowchart 700 illustrating the operation of the wireless communication device 110, such as a UE, according to a possible embodiment. The flowchart 700 can be used for transmission by selecting from a set of higher layer configured resources, such as for signaling multiple resource assignments, and the UE can select a resource assignment based on a selection criterion. At 710, the flowchart 700 can begin.

At 720, an indication that indicates a set of frequency domain resource blocks for possible Physical Uplink Shared Channel (PUSCH) transmission in an uplink subframe can be acquired. For example, the resource set size can be the number of resource blocks for possible PUSCH transmission. The subset of resource blocks can be a first subset of resource blocks. The set of frequency domain resource blocks can be smaller than an uplink transmission bandwidth configuration. For example, the uplink transmission bandwidth configuration can be the uplink system bandwidth. The indication can be a higher layer message from a layer higher than a physical layer. For example, the higher layer message can be a RRC message, a MAC message, or any other higher layer message or the indication can be in a physical layer message. For example, the indication can include at least a physical layer message. The indication can be implicitly indicated via a RACH configuration or can be otherwise indicated. The indication can also be a bitmap indication that indicates whether or not each resource block in the set of frequency domain resource blocks is assigned for possible PUSCH transmission.

At 730, a physical layer message can be received. The physical layer message can indicate a second subset of resource blocks within the set of frequency domain resource blocks for possible PUSCH transmission in the uplink subframe. At 740, higher layer signalling can be received that indicates open loop power control parameters.

At 750, a subset of resource blocks can be selected from the set of frequency domain resource blocks for possible PUSCH transmission based on a selection criterion. The selection criterion can use at least a resource set size acquired from the indication, a modulo function, and an identifier associated with the UE. The selected subset of resource blocks can be one resource block. The selection criterion can use one or more of a subframe number and a resource block aggregation level. For example, a resource block aggregation level can be a number of resource blocks on which the UE transmits. The UE can have a UE Cell Radio Network Temporary Identifier (C-RNTI) and the subset of resource blocks can be selected in response to not detecting a DCI Format 0/4 with a Cyclic Redundancy Code (CRC) scrambled by the UE C-RNTI on a Downlink (DL) control channel for the uplink subframe. Selecting can also include selecting a cyclic shift for a Demodulation Reference Signal (DMRS) for the PUSCH transmission in the uplink subframe based on at least an identifier of the UE.

At 760, transmission power for PUSCH transmission in the subset of resources can be determined based on the open loop power control parameters. At 770, at least one other parameter can be determined for the PUSCH transmission. According to a possible embodiment, a cyclic shift can be determined for a DMRS for the PUSCH transmission and a scrambling initialization for the PUSCH transmission can be selected based on at least the determined cyclic shift for the DMRS for the PUSCH transmission in the uplink subframe. According to a possible embodiment, an Orthogonal Cover Code (OCC) sequence for a Demodulation Reference Signal (DMRS) can be selected for the PUSCH transmission in the uplink subframe based on at least an identifier of the UE. According to a possible embodiment, an OCC sequence can be determined for a DMRS for the PUSCH transmission and a scrambling initialization for the PUSCH transmission can be selected based on at least the determined OCC sequence for the DMRS for the PUSCH transmission in the uplink subframe.

At 780, a PUSCH can be transmitted in the selected subset of resource blocks in the uplink subframe. The PUSCH may be transmitted in the selected first subset of resource blocks in the uplink subframe only if the first subset of resource blocks belongs to the second subset of resource blocks. The PUSCH may also be transmitted in the selected subset of resource blocks regardless of whether the first subset of resource blocks belongs to the second subset of resource blocks. At 790, the flowchart 700 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
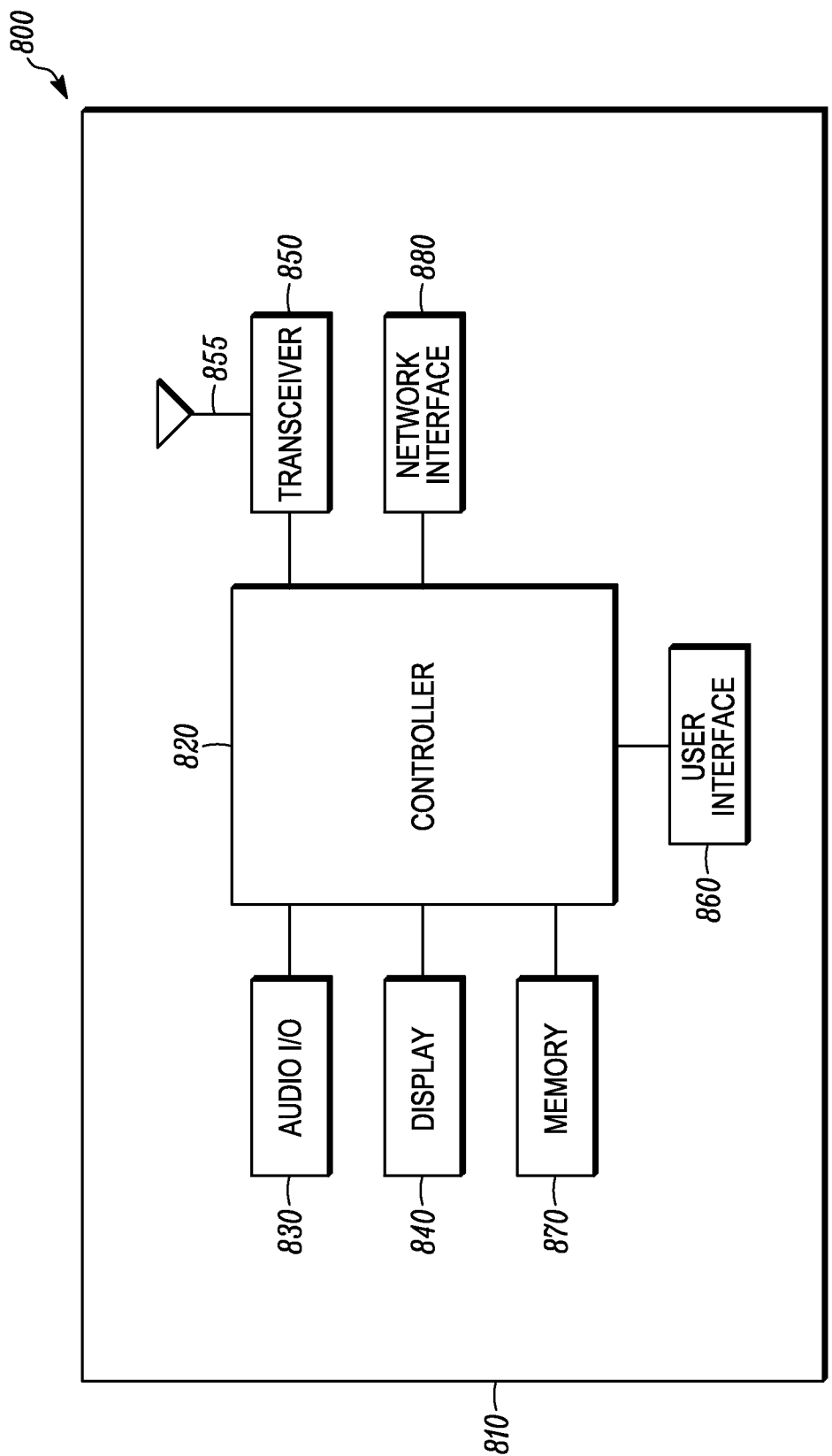
FIG. 8 is an example block diagram of an apparatus according to a possible embodiment.

FIG. 8 is an example block diagram of an apparatus 800, such as the wireless communication device 110, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a universal serial bus port, an Ethernet port, an infrared transmitter/receiver, a USB port, an IEEE 1398 port, a WLAN transceiver, or any other interface that can connect an apparatus to a network, device, or computer and that can transmit and receive data communication signals. The memory 870 can include a random access memory, a read only memory, an optical memory, a flash memory, a removable memory, a hard drive, a cache, or any other memory that can be coupled to a wireless communication device.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating a wireless communication device and implementing the disclosed embodiments.

According to a possible embodiment, the controller 820 can acquire configuration information regarding a Downlink Control Information (DCI) message for a Physical Uplink Shared Channel (PUSCH) transmission. The transceiver 850 can receive the DCI message on a Physical Downlink Control Channel (PDCCH) in a first subframe. The DCI message can indicate a plurality of resource assignments in a second subframe for an uplink carrier from which the UE selects one resource assignment for transmission on the uplink carrier. The DCI message can be Cyclic Redundancy Check (CRC) scrambled by a Radio Network Temporary Identifier (RNTI) that can be indicated via higher layers that are higher than a physical layer. Each resource assignment of the plurality of resource assignments can have the same number of resource blocks. The controller 820 can select a resource assignment from the plurality of resource assignments using a selection criterion. The apparatus 800 can have a UE identifier and the selection criterion can be based on at least a hashing function based on the UE identifier or can be based on any other useful selection criterion. The apparatus 800 can have a Cell Radio Network Temporary Identifier (C-RNTI) and the controller 820 can determine a parameter for a Demodulation Reference Signal (DMRS) for transmission of a data packet based on the C-RNTI. The apparatus 800 can also have a Cell Radio Network Temporary Identifier (C-RNTI) and a contention-based Cell Radio Network Temporary Identifier (CB C-RNTI) configured via higher layers and the DCI can be scrambled by the CB C-RNTI. The controller 820 can also determine a parameter for a DMRS for the transmission based on at least one field indicated in the DCI message. For example, the parameter can include a cyclic shift, an Orthogonal Cover Code (OCC) sequence, or other parameters for a DMRS for a transmission. The transceiver 850 can transmit a data packet on the PUSCH in a resource of the selected resource assignment in the second subframe on the uplink carrier.

According to another possible embodiment, the controller 820 can acquire configuration information regarding a Downlink Control Information (DCI) message for a Physical Uplink Shared Channel (PUSCH) transmission. The transceiver 850 can receive a DCI message in a first subframe. The DCI message can indicate a resource assignment and a modulation and coding scheme. The DCI message can indicate a plurality of cyclic shifts from which the UE may select one cyclic shift for transmission in a second subframe for an uplink carrier. The number of cyclic shifts in the plurality of cyclic shifts indicated in the DCI message can be two or any other useful number. For example, a first cyclic shift can be indicated using a cyclic shift for Demodulation Reference Signal (DMRS) and Orthogonal Cover Code (OCC) index field of the DCI message. A second cyclic shift can be indicated using a field that is used for Transmit Power Control (TPC) for a Physical Uplink Shared Channel (PUSCH) and a field used for New Data Indicator (NDI). The DCI message can implicitly or explicitly indicate the number of cyclic shifts in the plurality of cyclic shifts from which the UE can select one cyclic shift for transmission. The controller 820 can select a cyclic shift from the plurality of indicated cyclic shifts based on a selection criterion. The controller 820 can also select a scrambling initialization for the PUSCH transmission based on at least the selected cyclic shift for DMRS. The transceiver 850 can transmit a data packet on a PUSCH in a resource indicated by the resource assignment and modulation and coding scheme and using a DMRS based on the selected cyclic shift in the second subframe on the uplink carrier.

According to a possible implementation the transceiver 850 can receive the DCI message on a Physical Downlink Control Channel (PDCCH) in a first subframe. The DCI message can indicate the resource assignment and the modulation and coding scheme and indicating a plurality of cyclic shifts from which the UE may select one cyclic shift for transmission. The DCI message can be Cyclic Redundancy Check (CRC) scrambled by a Radio Network Temporary Identifier (RNTI) that is indicated via higher layers that are higher than a physical layer.

According to another possible implementation, the indication of a plurality of cyclic shifts can include an indication of a plurality of cyclic shift and Orthogonal Cover Code (OCC) sequence pairs. The controller 820 can select the cyclic shift cyclic shift and an OCC sequence pair from the plurality of indicated cyclic shift and OCC sequence pairs based on the selection criterion. The transceiver 850 can transmit the data packet on the PUSCH using a DMRS based on the selected cyclic shift and OCC sequence pair.

According to another possible embodiment, the controller 820 can acquire an indication that indicates a set of frequency domain resource blocks for possible PUSCH transmission in an uplink subframe. The indication can be a bitmap indication that indicates whether or not each resource block in the set of frequency domain resource blocks is assigned for possible PUSCH transmission. The indication can also be any other indication The controller 820 can select a subset of resource blocks from the set of frequency domain resource blocks for possible PUSCH transmission based on a selection criterion. The selection criterion can use at least a resource set size acquired from the indication, a modulo function, and an identifier associated with the apparatus 800. The selection criterion can also use one or more of a subframe number and a resource block aggregation level. The transceiver 850 can transmit a PUSCH in the selected subset of resource blocks in the uplink subframe.

According to a possible implementation the subset of resource blocks can be a first subset of resource blocks. The indication can be a higher layer message from a layer higher than a physical layer. The transceiver 850 can receive a physical layer message. The physical layer message can indicate a second subset of resource blocks within the set of frequency domain resource blocks for possible PUSCH transmission in the uplink subframe. The transceiver 850 can transmit PUSCH in the selected first subset of resource blocks in the uplink subframe only if the first subset of resource blocks belongs to the second subset of resource blocks.

According to another possible implementation, the transceiver 850 can receive higher layer signalling indicating open loop power control parameters. The controller 820 can determine a transmission power for PUSCH transmission in the subset of resources based on the open loop power control parameters. The controller 820 can also select a parameter for a Demodulation Reference Signal (DMRS) for the PUSCH transmission in the uplink subframe based on at least an identifier of the apparatus 800. The controller 820 can further determine a parameter for a DMRS for the PUSCH transmission and can select a scrambling initialization for the PUSCH transmission based on at least the determined parameter for the DMRS for the PUSCH transmission in the uplink subframe. The determined parameter can be a cyclic shift, an OCC, or any other parameter useful for a DMRS for a PUSCH transmission in an uplink subframe.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
   receiving a downlink control information message in a first subframe, the downlink control information message indicating a resource assignment and a modulation and coding scheme and indicating a plurality of cyclic shifts from which the user equipment may select one cyclic shift for transmission in a second subframe for an uplink carrier;
   selecting a cyclic shift from the plurality of indicated cyclic shifts based on a selection criterion; and
   transmitting a data packet on a physical uplink shared channel in a resource indicated by the resource assignment and modulation and coding scheme, and using a demodulation reference signal based on the selected cyclic shift in the second subframe on the uplink carrier.

2. The method according to claim 1, wherein the number of cyclic shifts in the plurality of cyclic shifts indicated in the downlink control information message is two.

3. The method according to claim 1, wherein a first cyclic shift is indicated using a cyclic shift for demodulation reference signal and orthogonal cover code index field of the downlink control information message.

4. The method according to claim 3, wherein a second cyclic shift is indicated using a field used for transmit power control for a physical uplink shared channel and a field used for a new data indicator.

5. The method according to claim 1, where the downlink control information message implicitly indicates the number of cyclic shifts in the plurality of cyclic shifts from which the user equipment can select one cyclic shift for transmission.

6. The method according to claim 1, further comprising selecting a scrambling initialization for the physical uplink shared channel transmission based on at least the selected cyclic shift for demodulation reference signal.

7. The method according to claim 1, further comprising acquiring configuration information regarding the downlink control information message for a physical uplink shared channel transmission prior to receiving the downlink control information message.

8. The method according to claim 7, wherein receiving comprises receiving the downlink control information message on a physical downlink control channel in a first subframe, the downlink control information message indicating the resource assignment and the modulation and coding scheme and indicating a plurality of cyclic shifts from which the user equipment may select one cyclic shift for transmission, where the downlink control information message is cyclic redundancy check scrambled by a radio network temporary identifier that is indicated via higher layers that are higher than a physical layer.

9. The method according to claim 1,
wherein the indication of a plurality of cyclic shifts includes an indication of a plurality of cyclic shift and orthogonal cover code sequence pairs,
wherein selecting a cyclic shift includes selecting a cyclic shift and orthogonal cover code sequence pair from the plurality of indicated cyclic shift and orthogonal cover code sequence pairs based on the selection criterion, and
wherein transmitting comprises transmitting the data packet on the physical uplink shared channel using a demodulation reference signal based on the selected cyclic shift and orthogonal cover code sequence pair.

10. An apparatus comprising:
a transceiver configured to receive a downlink control information message in a first subframe, the downlink control information message indicating a resource assignment and a modulation and coding scheme and the downlink control information message indicating a plurality of cyclic shifts from which the apparatus may select one cyclic shift for transmission in a second subframe for an uplink carrier; and
a controller configured to select a cyclic shift from the plurality of indicated cyclic shifts based on a selection criterion,
wherein the transceiver is configured to transmit a data packet on a physical uplink shared channel in a resource indicated by the resource assignment and modulation and coding scheme, and using a demodulation reference signal based on the selected cyclic shift in the second subframe on the uplink carrier.

11. The apparatus according to claim 10, wherein the number of cyclic shifts in the plurality of cyclic shifts indicated in the downlink control information message is two.

12. The apparatus according to claim 10, wherein a first cyclic shift is indicated using a cyclic shift for demodulation reference signal and orthogonal cover code index field of the downlink control information message.

13. The apparatus according to claim 12, wherein a second cyclic shift is indicated using a field that is used for transmit power control for a physical uplink shared channel and a field used for a new data indicator.

14. The apparatus according to claim 10, where the downlink control information message implicitly indicates the number of cyclic shifts in the plurality of cyclic shifts from which the apparatus can select one cyclic shift for transmission.

15. The apparatus according to claim 10, wherein the controller is configured to select a scrambling initialization for the physical uplink shared channel transmission based on at least the selected cyclic shift for demodulation reference signal.

16. The apparatus according to claim 10, wherein the controller is configured to acquire configuration information regarding the downlink control information message for a physical uplink shared channel transmission prior to receiving the downlink control information message.

17. The apparatus according to claim 16,
wherein the transceiver is configured to receive the downlink control information message on a physical uplink shared channel in a first subframe,
wherein the downlink control information message indicates the resource assignment and the modulation and coding scheme and indicating a plurality of cyclic shifts from which the apparatus may select one cyclic shift for transmission, and
wherein the downlink control information message is cyclic redundancy check scrambled by a radio network temporary identifier that is indicated via higher layers that are higher than a physical layer.

18. The apparatus according to claim 10,
wherein the indication of a plurality of cyclic shifts includes an indication of a plurality of cyclic shift and orthogonal cover code sequence pairs,
wherein the controller is configured to select the cyclic shift and an orthogonal cover code sequence pair from the plurality of indicated cyclic shift and orthogonal cover code sequence pairs based on the selection criterion, and
wherein the transceiver is configured to transmit the data packet on the physical uplink shared channel using a demodulation reference signal based on the selected cyclic shift and orthogonal cover code sequence pair.

19. A method in a user equipment, the method comprising:
acquiring configuration information regarding the downlink control information message for a physical uplink shared channel transmission prior to receiving the downlink control information message;
receiving a downlink control information message on a physical downlink control channel in a first subframe, the downlink control information message indicating a resource assignment and a modulation and coding scheme and indicating a plurality of cyclic shifts, from which the user equipment may select one cyclic shift for transmission in a second subframe for an uplink carrier;
selecting a cyclic shift from the plurality of indicated cyclic shifts based on a selection criterion; and
transmitting a data packet on the physical uplink shared channel in a resource indicated by the resource assignment and modulation and coding scheme, and using a demodulation reference signal based on the selected cyclic shift in the second subframe on the uplink carrier.

20. The method according to claim 19,
wherein the indication of a plurality of cyclic shifts includes an indication of a plurality of cyclic shift and orthogonal cover code sequence pairs,
wherein selecting a cyclic shift includes selecting a cyclic shift and orthogonal cover code sequence pair from the plurality of indicated cyclic shift and orthogonal cover code sequence pairs based on the selection criterion, and
wherein transmitting comprises transmitting the data packet on the physical uplink shared channel using a demodulation reference signal based on the selected cyclic shift and orthogonal cover code sequence pair.

* * * * *